US012644810B2

(12) United States Patent
Guo et al.

(10) Patent No.: US 12,644,810 B2
(45) Date of Patent: Jun. 2, 2026

(54) TANK BODY DEVICE FOR MEASURING SLURRY DENSITY OF THERMAL POWER GENERATION SLURRY IN THERMAL POWER PLANTS

(71) Applicant: Inner Mongolia Helin Power Generation Co., Ltd., Hohhot City (CN)

(72) Inventors: Cong Guo, Hohhot City (CN); Xiaohui Zhang, Hohhot City (CN); Fu Sun, Hohhot City (CN); Qiang Li, Hohhot City (CN); Zhiwei Wang, Hohhot City (CN); Long Jia, Hohhot City (CN); Liwen Xing, Hohhot City (CN); Zhihai Zhang, Hohhot City (CN)

( * ) Notice: Subject to any disclaimer, the term of this patent is extended or adjusted under 35 U.S.C. 154(b) by 283 days.

(21) Appl. No.: 18/492,416

(22) Filed: Oct. 23, 2023

(65) Prior Publication Data

US 2024/0295480 A1 Sep. 5, 2024

(30) Foreign Application Priority Data

Mar. 2, 2023 (CN) .......................... 202310191406.1

(51) Int. Cl.
B65D 90/22 (2006.01)
G01N 9/06 (2006.01)
(52) U.S. Cl.
CPC .............. G01N 9/06 (2013.01); B65D 90/22 (2013.01)

(58) Field of Classification Search
CPC .......... G01N 9/06; G01N 9/04; B65D 88/128; B65D 88/00; B65D 90/12; B65D 90/22
USPC ......... 73/433–440, 444–454; 52/1, 146–152, 52/169.7, 169.8; 248/550, 560–567, 580, 248/582, 584, 592, 593, 595, 596, 598, 248/603, 604, 646, 648, 660, 661, 664, 248/668, 678; 220/565, 567
See application file for complete search history.

(56) References Cited

FOREIGN PATENT DOCUMENTS

CN 116902409 * 10/2023

* cited by examiner

*Primary Examiner* — Robert R Raevis

(57) ABSTRACT

A tank body device for measuring slurry density of thermal power generation slurry is provided. Particularly, the tank body includes a clamping assembly, a clinging assembly, and a plurality of push assembly. The clamping assembly, with a base case and closing members, securely holds the tank body. The clinging assembly, featuring telescopic members, articulation pieces, and clamping rings, provides additional support and ensures stability. Each push assembly includes a moving part, push member, and first spring, all integrated into the system. This arrangement enables automatic realignment of the tank body when it tilts, reducing the workload for plant staff and ensuring precise measurement of weight and pressure values.

10 Claims, 8 Drawing Sheets

301c

301a

301f

301

301d

B

301g

TANK BODY DEVICE FOR MEASURING SLURRY DENSITY OF THERMAL POWER GENERATION SLURRY IN THERMAL POWER PLANTS

CROSS-REFERENCE TO RELATED APPLICATIONS

The present application claims priority from China patent application serial number 2023101914061 filed Mar. 2, 2023 and the disclosure of which is incorporated herein by reference in its entirety.

FIELD OF THE INVENTION

The present invention relates to the technical field of slurry density metering technology. More specifically the present invention relates to a tank body device for measuring slurry density within a thermal power plant.

BACKGROUND OF THE INVENTION

In thermal power plants, the measurement of slurry density is a common practice, typically carried out using density meter tank bodies. To gauge the density of limestone slurry within a thermal power plant, workers typically transfer the slurry from a slurry tank to a density meter tank body. Subsequently, they measure and compute the relevant weight and pressure values. Due to the specific demands of thermal power plant operations, there is a constant need for real-time monitoring and adjustment of slurry density in the slurry tank. Consequently, the density meter tank body is frequently employed. In situations where the density meter tank body becomes damaged, prompt replacement is essential to prevent disruptions in thermal power plant operations. Most thermal power plants employ density meter tank bodies with a base featuring a clamping mechanism, facilitating quick replacement by loosening this mechanism when the tank body is damaged. However, it's not uncommon for the base clamping devices used in these plants to experience sudden vibrations during operation, leading to an unexpected tilting of the tank body. This can result in a gap forming between the clamping device and the density meter tank body, ultimately causing the tank body to topple over. Such incidents can disrupt density measurement activities, potentially damage the ground due to the tank body's collision, and even lead to the spillage of solution within the tank body, polluting the work environment. The clamping mechanisms currently employed in many thermal power plants are often passive in addressing these situations. Workers typically identify this issue during inspections, posing a significant safety risk to normal plant operations. Consequently, the slurry density measurement devices within a thermal power plant may not consistently maintain a stable working condition in real-time.

SUMMARY OF THE INVENTION

This section aims to summarize certain aspects of the embodiments of the present invention. It also offers a brief introduction to some preferred embodiments. To maintain clarity and avoid any confusion in the objectives of this section, the abstract, and the title of this invention, simplifications or omissions may be employed. It is important to note that such simplifications or omissions should not be interpreted as limiting the scope of the invention.

The invention is presented as a response to the issues arising from the tilting of density meter tank bodies in conventional thermal power plants. In these scenarios, the tilting often goes unnoticed until identified and corrected by plant personnel, posing potential hazards to plant operations.

Therefore, the present invention proposes a solution of automatically repositioning a tilted density meter tank body to its original orientation and securely fastening it in place. This ensures that the density meter tank body's functionality remains unimpaired, enabling the accurate measurement of the desired weight and pressure values.

To address the aforementioned technical challenges, the present invention provides the following technical scheme: a tank body device for measuring a slurry density meter of a thermal power plant, including:

a clamping assembly, having a base case, a rotating member, closing members, and a tank body, in which the rotating member is arranged inside the base case in a penetrating manner, with the closing members situated at an upper end of the rotating member and the tank body positioned on the inner side of the closing member; particularly, the rotating member and the base case are rotatably connected, the closing members and the rotating member are rotatably connected, and the tank body and the closing members are fitly connected;

a clinging assembly, encompassing telescopic members, articulation pieces, and clamping rings, in which the articulation pieces are positioned at the upper ends of the closing members, the telescopic members are situated at the upper ends of the articulation pieces, the clamping rings are arranged at the upper ends of the telescopic members, the articulation pieces and the closing members are fixed together, the telescopic members are rotatably connected with the articulation pieces, and the clamping rings are fixedly connected with the telescopic members; and a plurality of push assembly, in which the push assembly includes a moving part, a push member, and a first spring, in which the moving part is positioned at the bottom end of the articulation pieces, the push member is arranged at the bottom end of the moving part, the push member penetrates through the base case, one end of the first spring is fixed on a side surface of the closing member with the other end fixed on a side surface of the moving part, the moving part is fixed with the articulation piece; the push member and the moving part are fixed together, and the first spring is fixed with the moving part and the closing member.

In a preferred embodiment of the tank body device for measuring slurry density of thermal power generation slurry, the rotating member has a first gear, a second gear, a rotating handle, and a rotating column, in which the first gear penetrates through a side surface of the base case, the second gear is situated on a side surface of the first gear, the rotating column is located on the inner side of the second gear, the rotating handle is positioned at the outer end of the first gear, the second gear is meshed with the first gear, the rotating handle and the first gear are securely connected, and the rotating column and the second gear are firmly connected.

In a preferred configuration of the tank body device for measuring slurry density of thermal power generation slurry, the closing member includes a first junction block, a second junction block, a first connecting columns, a first moving block, a second moving block, a third moving block, and a fourth moving block, in which the first junction block is positioned on the outer side of the rotating column, the second junction block is also placed on the outer side of the rotating column, the first connecting column is configured on both ends of the first junction block, the first connecting column is also disposed on both ends of the second junction block, the first moving block is configured on the left side of the first junction block, the second moving block is positioned on the right side of the first junction block, the third moving block is positioned on the front end of the second junction block, the fourth moving block is disposed on the rear end of the second junction block. Furthermore, the first junction block and the rotating column are rotatably connected, the second junction block and the rotating column are rotatably connected, the first connecting column and the first junction block are securely connected, the first connecting column and the second junction block are firmly connected, the first moving block and the first connecting column are rotatably connected, the second moving block and the first connecting column are rotatably connected, the third moving block and the first connecting column are rotatably connected, and the fourth moving block and the first connecting column are rotatably connected. As another embodiment of the tank body device for measuring slurry density of thermal power generation slurry, the closing member further includes a plurality of clamping block and a plurality of second connecting column, in which the second connecting columns are positioned on the outer end of the first moving block, the outer end of the second moving block, the outer end of the third moving block, and the outer end of the fourth moving block, respectively. The clamping blocks are correspondingly positioned on the upper ends of the second connecting columns. The second connecting columns and the first moving block, the second moving block, the third moving block, and the fourth moving block are all securely connected, correspondingly. Furthermore, the clamping blocks and the second connecting columns are rotatably connected.

As a preferred embodiment of the tank body device for measuring slurry density of thermal power generation slurry, each of the telescopic members includes an inner rod and an outer rod, in which the inner rod is positioned on the outer side of the clamping ring and the outer rod is disposed on the outer side of the inner rod; and the inner rod is firmly connected to the clamping ring, correspondingly and the outer rod and the inner rod are slidingly connected.

As a preferred embodiment of the tank body device for measuring slurry density of thermal power generation slurry, each of the articulation pieces includes an articulation seat and a rotating block, in which the rotating block is positioned on the bottom of the outer rod, the articulation seat is disposed on the outer side of the rotating block, the rotating block and the outer rod are fixed together, and the articulation seat and the rotating block are rotatably connected.

As a preferred embodiment of the tank body device for measuring slurry density of thermal power generation slurry, each of the moving parts includes a third gear, an intermediate block, a cavity, and a rotating column, in which the intermediate block is positioned on a side surface of the clamping block, the cavity is formed inside the intermediate block, the rotating column penetrates through the cavity, the third gear is positioned inside the cavity and disposed on the outer side of the rotating column, the intermediate block and each of the clamping block are fixedly connected, the rotating column and the intermediate block are firmly connected, and the third gear and the rotating column are rotatably.

As a preferred embodiment of the tank body device for measuring slurry density of thermal power generation slurry, the moving part further includes a first saw blade, a sliding chute, and sliding blocks, in which the sliding chute is formed on the upper surface of the clamping block, the sliding blocks are positioned on two ends of the first saw blade, the first saw blade is meshed with the third gear and fixedly connected to the sliding blocks, the first saw blade and the articulation seat are fixedly connected, and the sliding blocks are slidingly connected with the sliding chute.

As a preferred embodiment of the tank body device for measuring slurry density of thermal power generation slurry, the push member includes a bottom column, a second saw blade, and an extension block, in which the second saw blade is positioned on the outer side of the first spring, the bottom column is disposed on the bottom end of the second saw blade, and the extension block is positioned on a side surface of the bottom column. Furthermore, the second saw blade is meshed with the third gear, the second saw blade and the first spring are fixedly connected, the bottom column and the second saw blade are fixedly connected; and the extension block is firmly connected to the bottom column.

As a preferred embodiment of the tank body device for measuring slurry density of thermal power generation slurry, the push member further includes a ratchet wheel, a second spring, a meshing block, and a sliding case, in which the ratchet wheel is positioned on the outer side of the rotating column, the sliding case is disposed on a side surface of the extension block, the second spring is configured inside the sliding case, the meshing block is positioned inside the sliding case. Furthermore, the ratchet wheel is meshed with the meshing block, the second spring and the sliding case are fixedly connected while the other end of the second spring is firmly connected to the meshing block, and the meshing block and the sliding case are slidingly connected.

The tank body device designed for measuring the slurry density in thermal power generation processes offers several advantages. It enables the automatic realignment of the density meter tank body in thermal power plants when it tilts, eliminating the need for manual intervention and conserving the energy of the workforce. This automated adjustment ensures that the density meter tank body consistently delivers the desired weight and pressure values, preventing any potential damage or disruption in the measurement process caused by the tank body toppling over and colliding with the floor. Consequently, the slurry density measurement device used in thermal power plants maintains a stable operational state at all times.

BRIEF DESCRIPTION OF THE DRAWINGS

In order to more clearly describe the technical scheme of the embodiments of the present disclosure, a brief introduction will be given to the accompanying drawings required in the description of the embodiments. It is apparent that the accompanying drawings in the following description are only some embodiments of the present disclosure. Those of ordinary skill in the art can also obtain other drawings according to these drawings without creative work. In the drawings.

DETAILED DESCRIPTION

Figure 1:
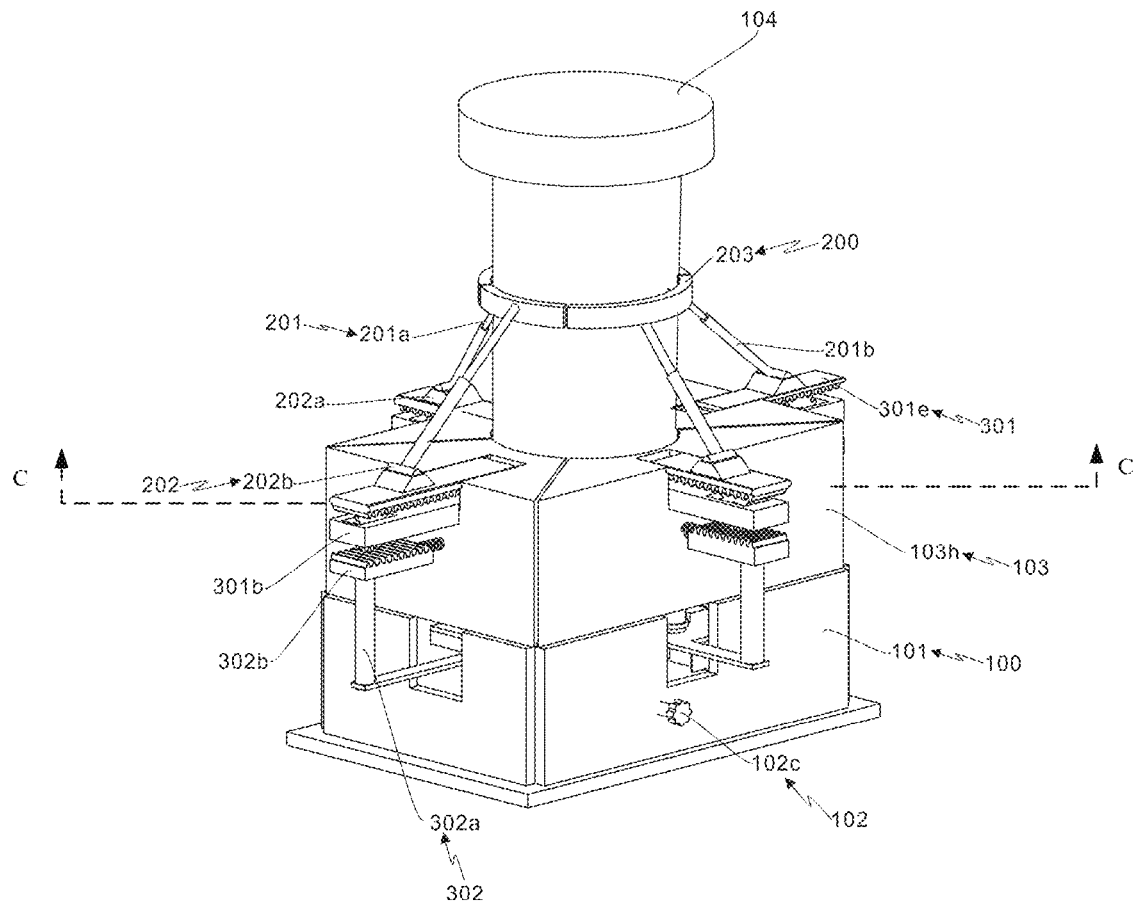
FIG. 1 is a three-dimensional structural diagram of the present invention.
Figure 2:
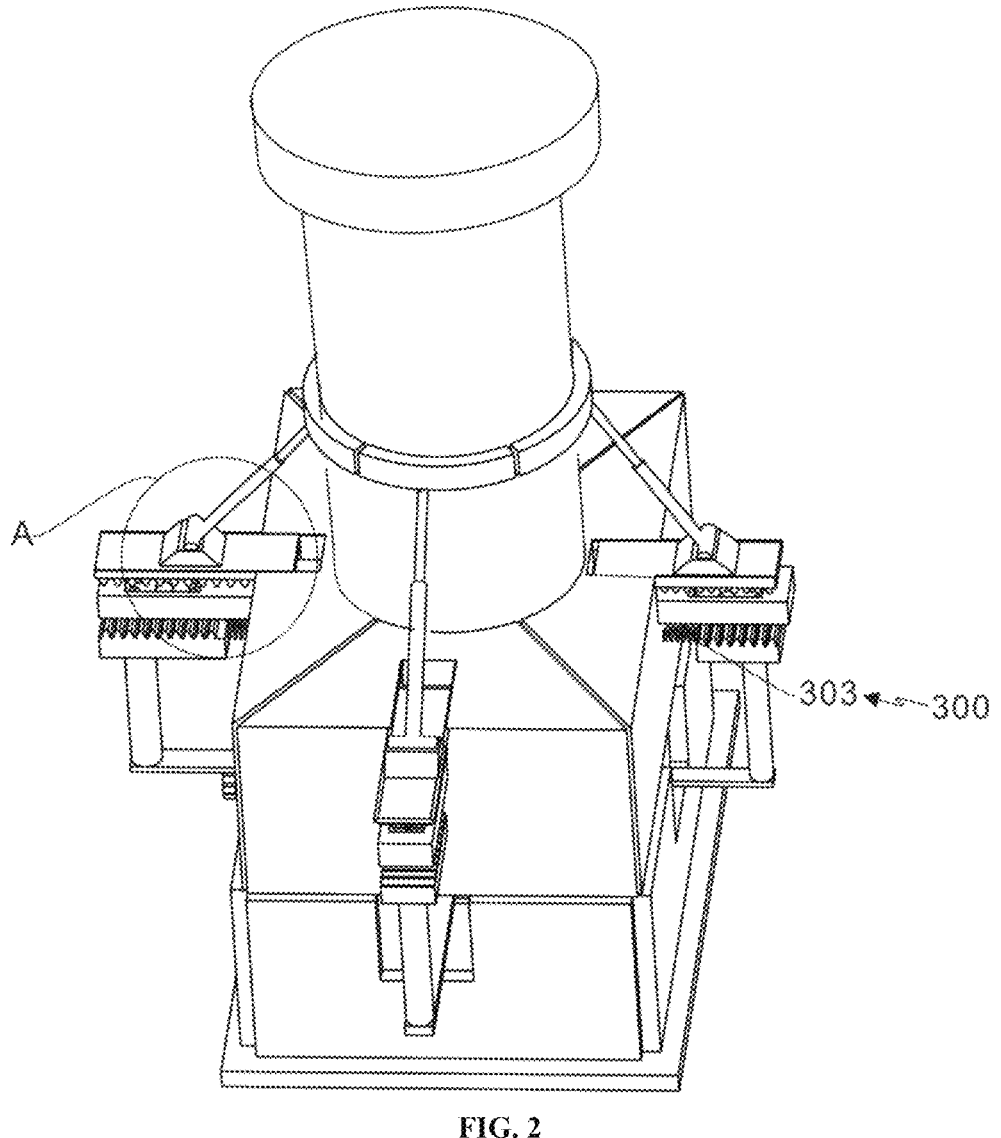
FIG. 2 is a three-dimensional structural diagram of the present invention in another perspective.
Figure 3:
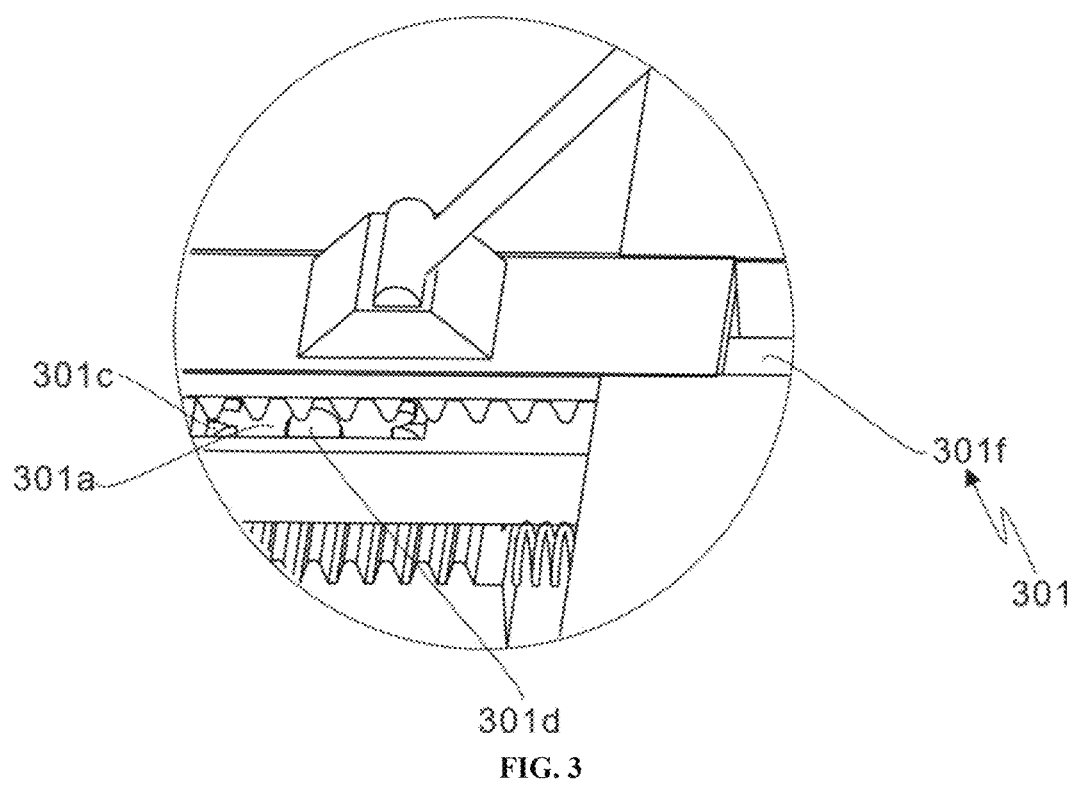
FIG. 3 is a partially enlarged diagram of the portion A in FIG. 2.

In order to make the foregoing objectives, features, and advantages of the present disclosure more obvious and understandable, the specific implementations of the present disclosure are described in detail with reference to the accompanying drawings of this specification.

Many specific details are set forth in the following description to facilitate a full understanding of the present disclosure. However, the present disclosure can also be implemented in other ways different from those described herein, and those skilled in the art can do so without departing from the connotation of the present disclosure. Therefore, the present disclosure is not limited by the specific embodiments disclosed below.

Secondly, the term "one embodiment" or "an embodiment" referred to herein refers to a specific feature, structure, or characteristic that can be included in at least one implementation of the present disclosure. The term "in one embodiment" appearing in different parts of this specification does not necessarily refer to the same embodiment, nor is it a separate or selective embodiment that is mutually exclusive with other embodiments.

Embodiment 1

Referring to FIG. 1, FIG. 2, FIG. 5, and FIG. 8, a first embodiment of the present invention is shown. This embodiment provides a filter device. A tank body device for measuring slurry density of thermal power generation slurry includes a clamping assembly 100, a clinging assembly 200, and a plurality of push assembly 300. The clamping assembly 100 serves to securely fasten the bottom of the tank body 104, while the clinging assembly 200 makes contact with a portion of the upper end of the tank body 104. In the event of the tank body 104 becoming skewed, the clinging assembly 200 exerts pressure on the push assemblies 300. This action, in turn, propels the clamping assembly 100 to rectify the position of the tank body 104, starting from the bottom and moving upwards, ultimately restoring the tank body 104 to a firmly clamped state. Furthermore, the multiple push assemblies 300 are strategically positioned in the front, rear, left, and right directions to prevent the tank body 104 from toppling over from any direction.

Specifically, the clamping assembly includes a base case, a rotating member, closing members, and a tank body. The rotating member is positioned within the base case, penetrating it. The closing members are situated at the upper end of the rotating member, while the tank body is positioned on the inner sides of the closing members. The rotating member and the base case are designed for smooth movement. Similarly, the closing members and the rotating member are designed for seamless operation. Furthermore, the tank body fits securely against the closing members. In practice, a user rotates the rotating member 102 to initiate the rotation of the closing members 103. This rotational movement causes the tank body 104 to be clamped or loosened. Additionally, the base case 101 is firmly anchored to the ground. This setup facilitates the quick replacement of the tank body 104 through the rotating member 102 in case of damage, preventing any disruption to the normal operation of the thermal power plant. Moreover, if the tank body 104 tilts, push members 302 are employed to straighten and clamp it. To ensure the proper functioning of the closing members 103 and push members 302, windows are incorporated into all four side surfaces of the base case 101, preventing any obstructions or blockages.

Preferably, the clinging assembly 200 includes telescopic members 201, articulation pieces 202, and clamping rings 203. The articulation pieces 202 are positioned at the upper ends of the closing members 103. Above them, the telescopic members 201 are located, while the clamping rings 203 are affixed to the upper ends of the telescopic members 201. The articulation pieces 202 and the closing members 103 are securely joined. The telescopic members 201 operate smoothly in conjunction with the articulation pieces 202, while the clamping rings 203 remain stationary. When the closing members 103 clamp the tank body 104 securely, the clamping rings 203 at the top ends of the telescopic members 201 press firmly against the tank body 104, providing additional stability to the tank body 104. Furthermore, when the tank body 104 requires removal for replacement, the articulation pieces 202 facilitate the rotation of the telescopic members 201, enabling them to disengage from the tank body 104 without hindering the replacement process. Each closing member 103 is paired with a corresponding telescopic member 201. Consequently, when the tank body 104 tilts to one side, the telescopic members 201 on the opposite sides extend, without interfering with the functioning of the push members 302.

Each push assembly 300 includes a moving part 301, a push member 302, and a first spring 303. The moving part 301 is positioned at the bottom end of each articulation piece 202, and the push member 302 is affixed at the bottom end of the moving part 301. The push member 302 extends through the base case 101, while the first spring 303 is attached to a side surface of the closing member 103. The other end of the first spring 303 is connected to a side surface of the moving part 301. The moving part 301 and the articulation piece 202 are firmly joined, and similarly, the push member 302 and the moving part 301 are securely connected, as are the first spring 303 and the moving part 301. The first spring 303 is also securely connected to each closing member 103. When the tank body 104 tilts to one side, the corresponding moving part 301 moves outward for a certain distance, propelling the push member 302 to shift inward and compress the first spring 303. Consequently, the push member 302 compels the closing member 103 to securely clamp the tank body 104 once more. Following the straightening of the tank body, the push member 302 disengages from the closing member 103. The force of the first spring 303 drives the push member 302 to reset, prompting the moving part 301 to return to its initial position. Subsequently, the articulation piece 202 also resets, causing the clamping ring 203 to press firmly against the tank body 104 once more.

In operation, the user rotates the rotating member 102 to secure the closing members 103 in a tight grip on the bottom of the tank body 104. Following this, the orientation and height of the telescopic members 201 on the articulation pieces 202 are adjusted to ensure that the clamping rings 203 make a secure contact with the tank body 104, allowing the tank body 104 to function properly. In the event that the tank body 104 tilts to one side, it pushes the articulation piece 202 on the corresponding side outward, initiating the outward movement of the moving part 301. During this outward motion, the moving part 301 propels the push member 302 inwards, causing the closing member 103 to tightly clamp the tank body 104. Once the tank body 104 is firmly secured, the push member 302 disengages from the closing member 103. The first spring 303 then exerts force on the push member 302, resetting it and consequently triggering the moving part 301 to reset as well. This results in the clamping ring 203 making a firm contact with the tank 104 once more.

Embodiment 2

Figure 4:
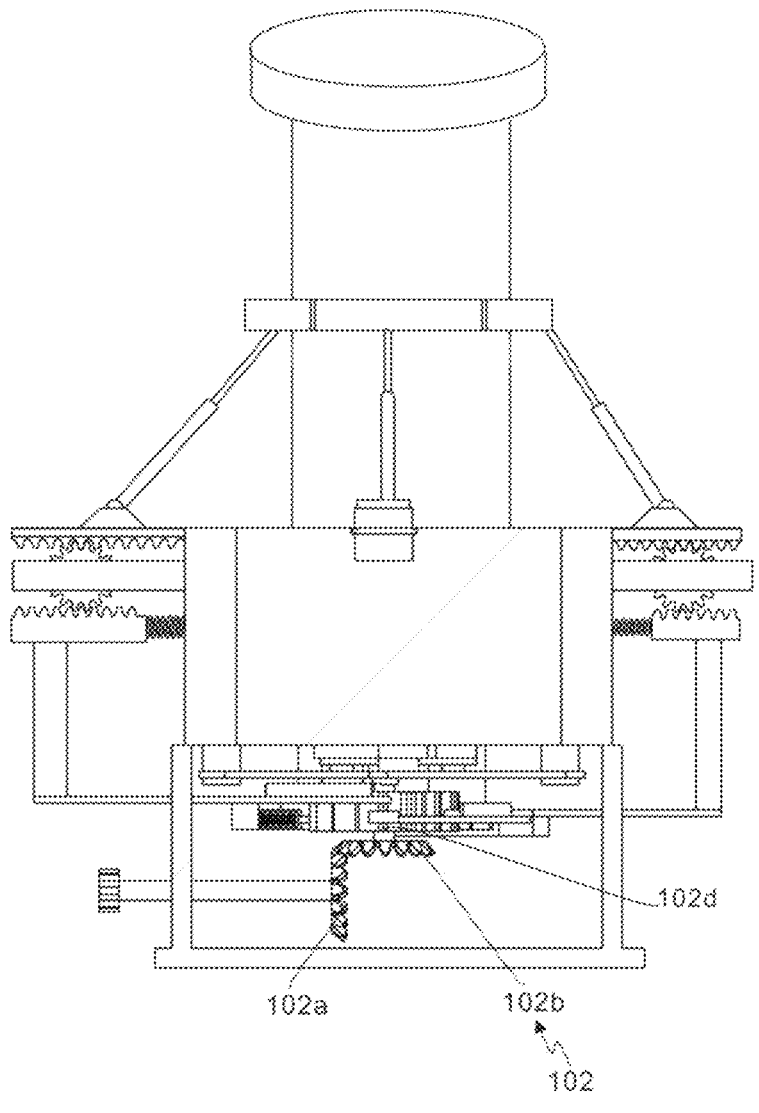
FIG. 4 is a left side sectional view of the present invention.
Figure 5:
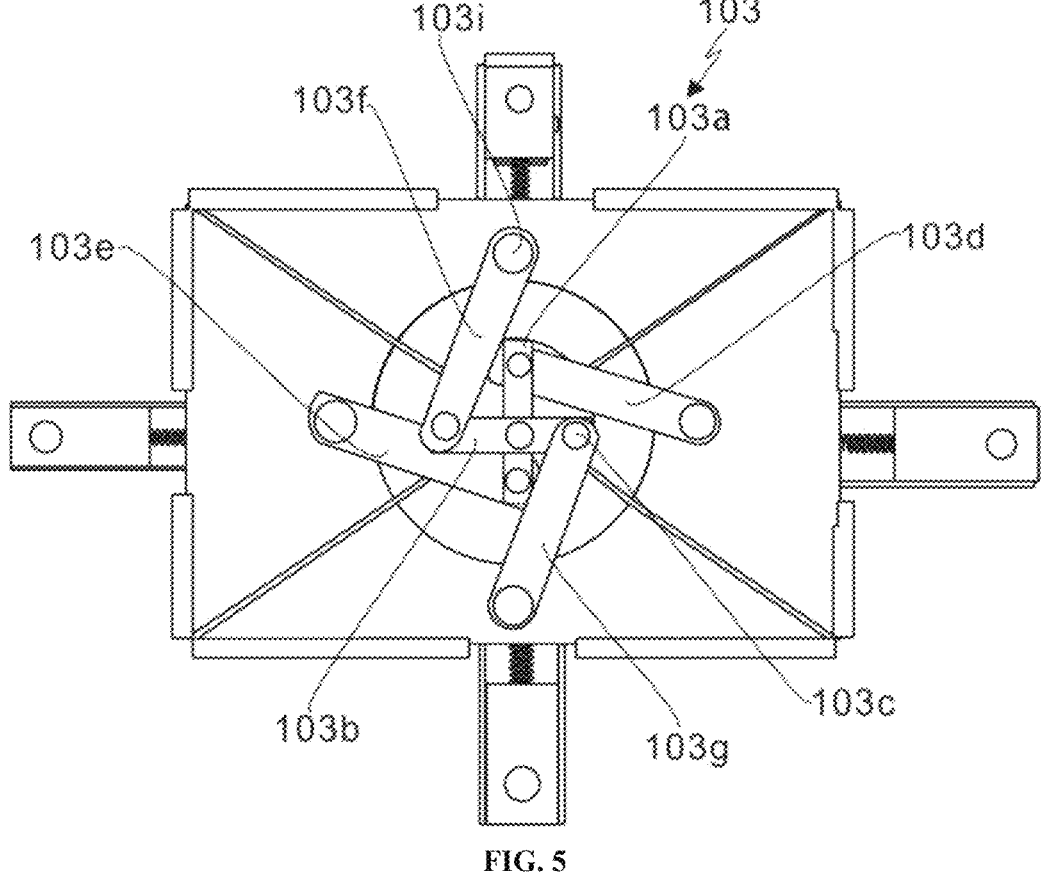
FIG. 5 is a top sectional view of the present invention at position C.
Figure 6:
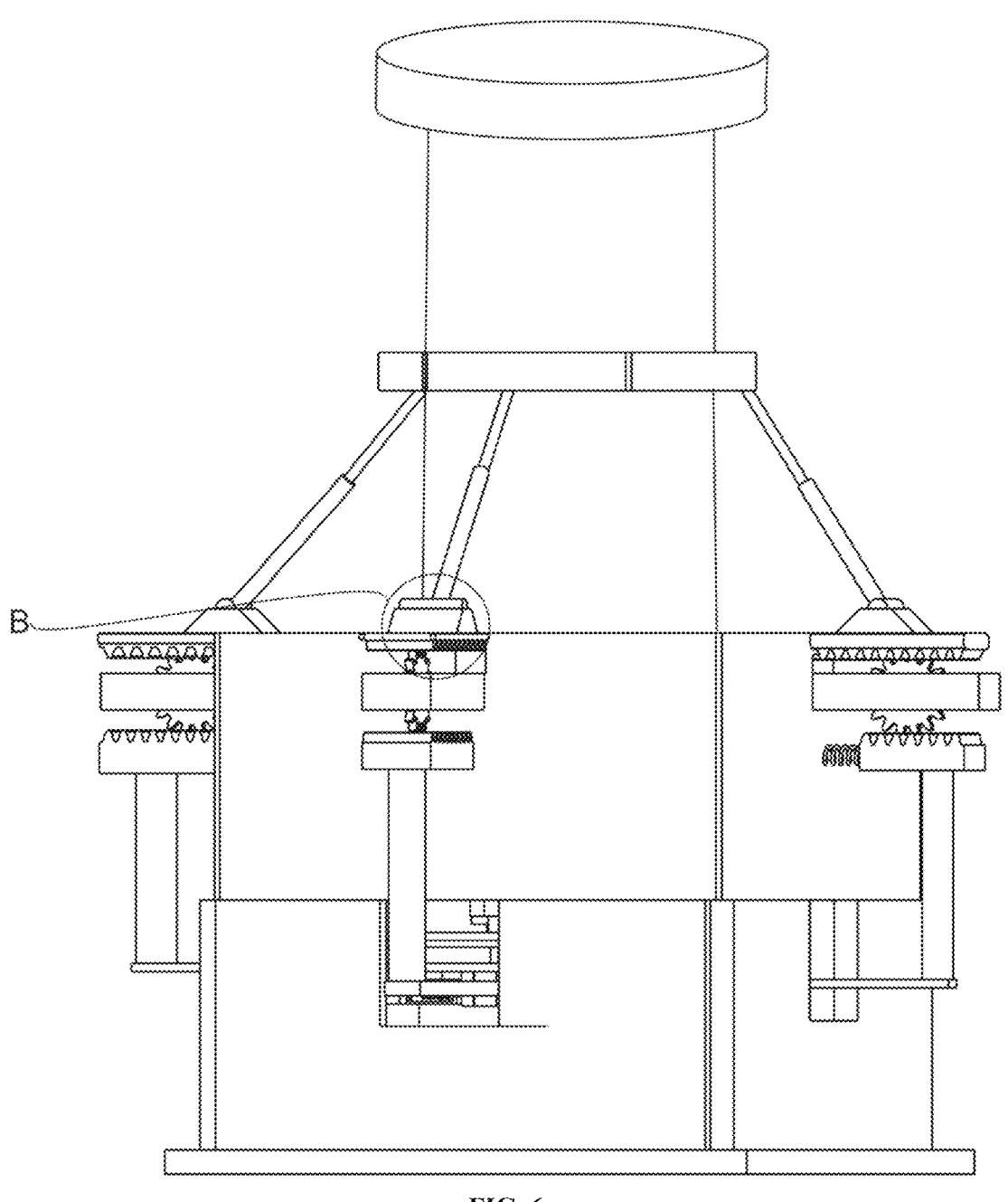
FIG. 6 is a three-dimensional structural diagram of the present invention in another perspective.
Figure 7:
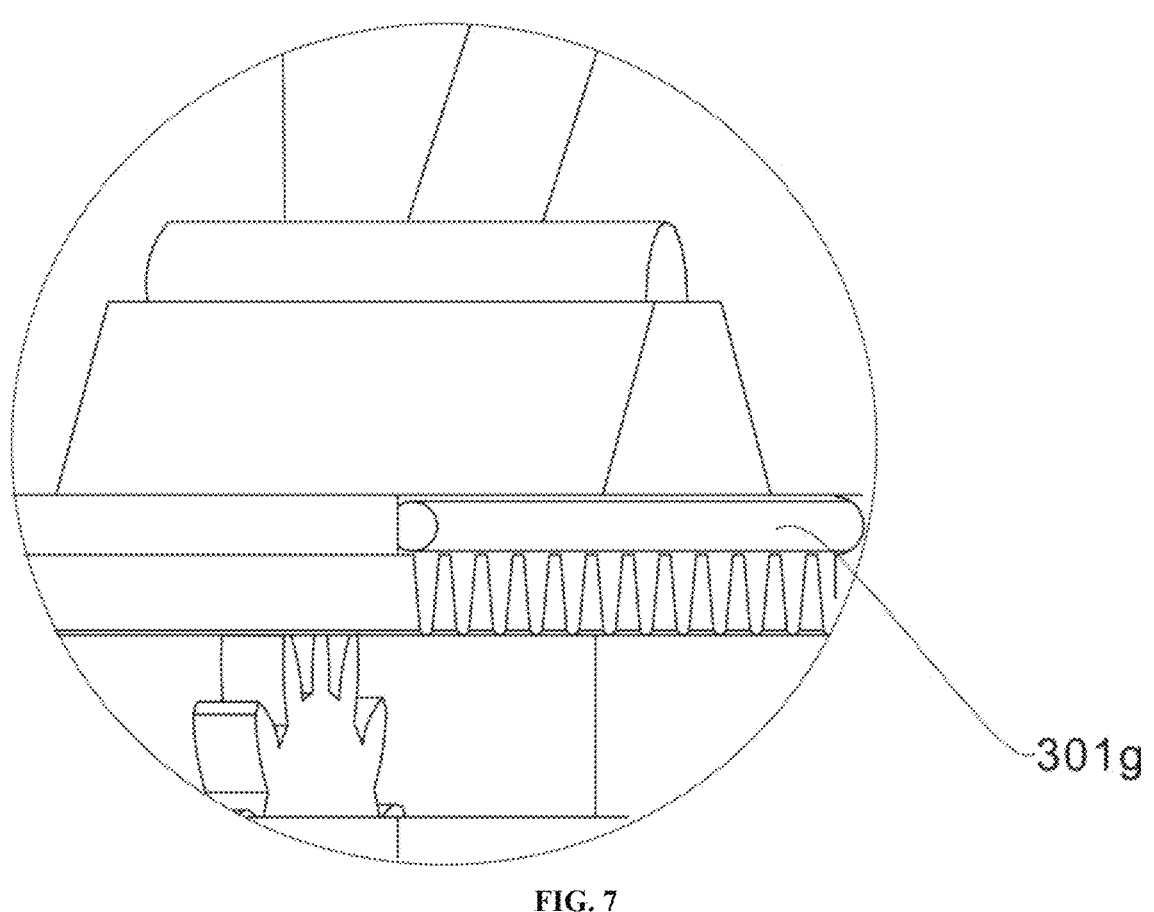
FIG. 7 is a partially enlarged diagram of a portion B in FIG. 6.
Figure 8:
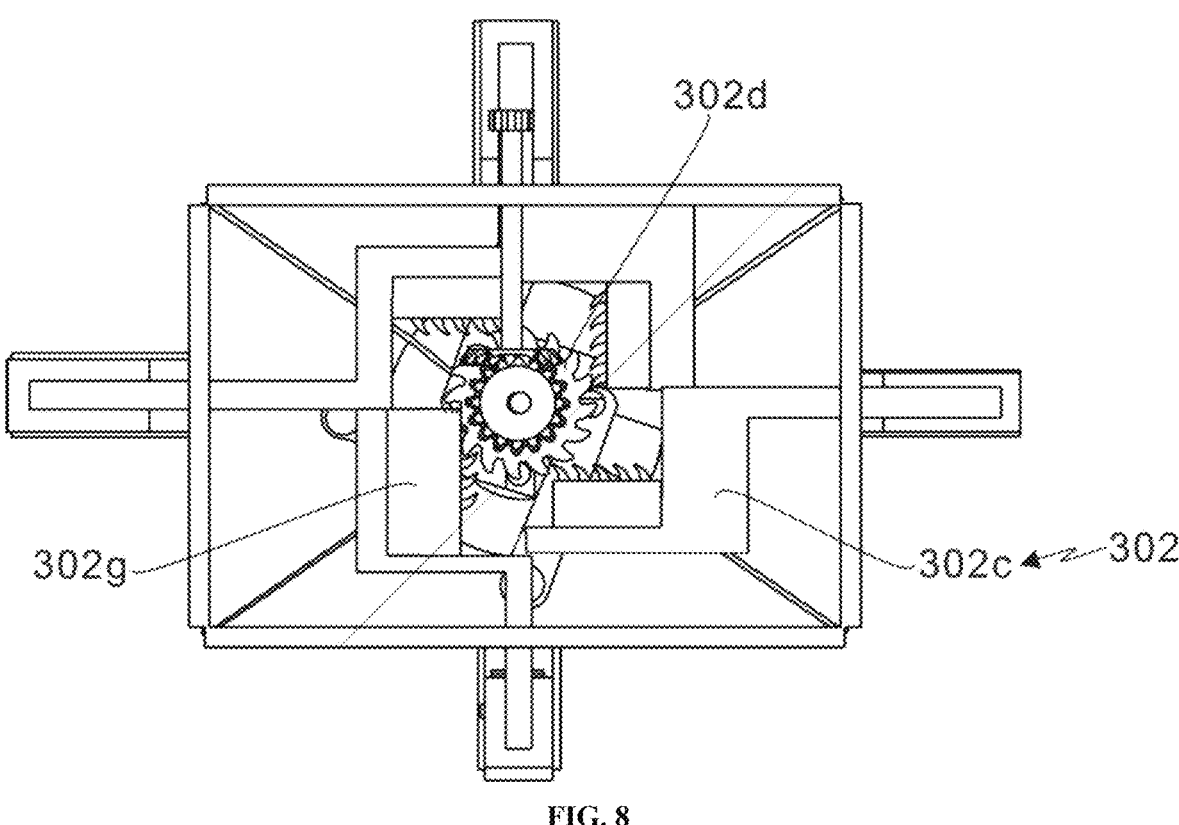
FIG. 8 is a top sectional view of the present invention in another perspective.
Figure 9:
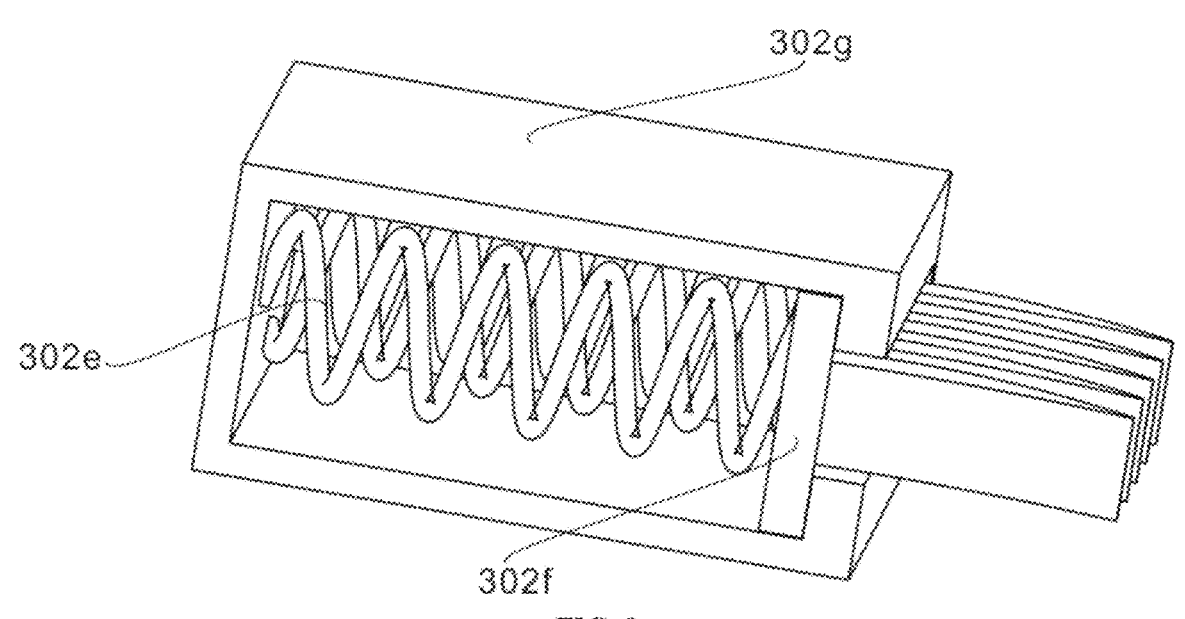
FIG. 9 is a three-dimensional structural diagram of a push member of the present invention.

Referring to FIG. 1, FIG. 4, and FIG. 5, a second embodiment of the present disclosure is presented, which is based on the previous embodiment.

Specifically, the rotating member 102 includes a first gear 102a, a second gear 102b, a rotating handle 102c, and a rotating column 102d. The first gear 102a penetrates through a side surface of the base case 101. The second gear 102b is arranged on a side surface of the first gear 102a. The rotating column 102d is situated on the inner side of the second gear 102b. The rotating handle 102c is positioned at the outer end of the first gear 102a. The second gear 102b meshes with the first gear 102a. The rotating handle 102c is securely connected to the first gear 102a, and the rotating column 102d is firmly connected to the second gear 102b. The user rotates the first gear 102a via the rotating handle 102c, causing the first gear 102a to rotate. This rotation, in turn, drives the second gear 102b to rotate, thereby inducing the rotation of the rotating column 102d. Notably, the tank body 104 remains securely clamped because of the interaction between the second gear 102a and the first gear 102b, preventing any loosening during this process.

Preferably, each closing member 103 includes a first junction block 103a, a second junction block 103b, a plurality of a first connecting column 103c, a first moving block 103d, a second moving block 103e, a third moving block 103f, and a fourth moving block 103g. The first junction block 103a is positioned on the outer side of the rotating column 102d, and the second junction block 103b is situated on the outer side of the rotating column 102d. The first connecting columns 103c are positioned at both ends of the first junction block 103a, as well as at both ends of the second junction block 103b. The first moving block 103d is located on the left side of the first junction block 103a, while the second moving block 103e is on the right side of the first junction block 103a. The third moving block 103f is situated at the front end of the second junction block 103b, and the fourth moving block 103g is at the rear end of the second junction block 103b. The first junction block 103a and the rotating column 102d are rotatably connected, as are the second junction block 103b and the rotating column 102d. The first connecting columns 103c are firmly connected to the first junction block 103a and the second junction block 103b. Furthermore, the first moving block 103d, the second moving block 103e, the third moving block 103f, and the fourth moving block 103g are all rotatably connected with the first connecting columns 103c. When the rotating column 102d is in motion, it drives both the first junction block 103a and the second junction block 103b to rotate in unison. Because of the presence of the first connecting columns 103c on both sides of the first junction block 103a and the second junction block 103b, the rotating column 102d can effectively collaborate with these components. This cooperation extends to the first moving block 103d, the second moving block 103e, the third moving block 103f, the fourth moving block 103g, and the clamping blocks 103h, all working together to securely clamp the tank body 104.

Preferably, each closing member 103 also includes clamping blocks 103h and second connecting columns 103i. The second connecting column 103i is positioned at one outer end of the first moving block 103d, another at the outer end of the second moving block 103e, a third at the outer end of the third moving block 103f, and the fourth at the outer end of the fourth moving block 103g. Clamping blocks 103h are affixed to the upper ends of the second connecting columns 103i. Specifically, the second connecting column 103i is securely attached to the first moving block 103d, the second moving block 103e, the third moving block 103f, and the fourth moving block 103g at positions away from the first connecting columns 103c, allowing the clamping blocks 103h to secure the tank body 104 in a rotatable way.

Preferably, each telescopic member 201 comprises an inner rod 201a and an outer rod 201b. The inner rod 201a is positioned on the outer side of the clamping ring 203 and firmly attached to it. The outer rod 201b is located on the outer side of the inner rod 201a, and the two are slidingly connected. When the tank body 104 is securely clamped, the user can extend the inner rod 201a outward to press the clamping ring 203 firmly against the upper part of the tank body 104, enhancing its support. Furthermore, if the tank body 104 tilts, the telescopic rod 201 can be extended outward to push and move the moving part.

Furthermore, each articulation piece 202 comprises an articulation seat 202a and a rotating block 202b. The rotating block 202b is situated at the bottom end of the outer rod 201b and firmly connected to it. The articulation seat 202a is positioned on the outer side of the rotating block 202b and is slidingly connected with it. The articulation seat 202a is securely mounted on each moving part 301, and the rotating block 202b can rotate the telescopic member 201 to adjust its angle, ensuring a tight abutment of the clamping ring 203 against the tank body 104.

During operation, the user rotates the first gear 102a using the rotating handle 102c. This rotation of the first gear 102a causes the second gear 102b to rotate as well, subsequently driving the rotating column 102d to rotate. The rotating column 102d, in turn, drives both the first junction block 103a and the second junction block 103b to rotate simultaneously. The first moving block 103d, the second moving block 103e, the third moving block 103f, and the fourth moving block 103g are all slidingly connected with the first connecting columns 103c positioned at the ends of the first junction block 103a and the second junction block 103b. This allows the rotating column 102d to drive the clamping blocks 103h, which are connected separately to the first moving block 103d, the second moving block 103e, the third moving block 103f, and the fourth moving block 103g, to slide into position and clamp the tank body 104 securely. Once the tank body 104 is tightly clamped, the user can adjust the angles of the telescopic members 201 by manipulating the rotating blocks 202b on the various clamping blocks 103h. Additionally, the heights of the telescopic members 201 can be adjusted by extending the inner rods 201a. These adjustments ensure that the clamping rings 203 make secure contact with the tank body 104, providing substantial support to it.

Embodiment 3

Referring to FIG. 1, FIG. 2, FIG. 3, FIG. 6, FIG. 7, FIG. 8, and FIG. 9, a third embodiment of the present invention is shown, which is based on the aforementioned two embodiments.

In more detail, each moving part 301 comprises a third gear 301*a*, an intermediate block 301*b*, a cavity 301*c*, and a rotating column 301*d*. The intermediate block 301*b* is affixed to a side surface of the clamping block 103*h*, with a cavity 301*c* formed within it. The rotating column 301*d* extends through this cavity 301*c*. The third gear 301*a* is positioned within the cavity 301*c* and also positioned on the outer side of the rotating column 301*d*. The intermediate block 301*b* and the clamping block 103*h* are firmly connected, as are the rotating column 301*d* and the intermediate block 301*b*. Furthermore, the third gear 301*a* and the rotating column 301*d* mesh together smoothly. Within the cavity 301*c*, the third gear 301*a* is situated on the inner side, and both its top and bottom interfaces with saw blades. This arrangement ensures that a first saw blade 301*e* and a second saw blade 302*b* move synchronously but in opposite directions, making the system simple and highly efficient.

Preferably, each moving part 301 further includes a first saw blade 301*e*, a sliding chute 301*f*, and sliding blocks 301*g*. The sliding chute 301*f* is integrated into the upper surface of the clamping block 103*h*, while the sliding blocks 301*g* are positioned at both ends of the first saw blade 301*e*. These first saw blades 301*e* are intricately meshed with the third gear 301*a* and firmly attached to the sliding blocks 301*g*. The first saw blade 301*e* and the articulation seat 202*a* are also securely connected, allowing for controlled tilting of the tank body 104. During operation, the first saw blade 301*e* slides along the clamping block 103*h*, remaining secure due to the presence of the third gear 301*a* and sliding blocks 301*g* on either side. When the third gear 301*a* rotates, the first saw blade 301*e* moves in the same direction as the gear's rotation. An outward rotation of the third gear 301*a* causes the first saw blade 301*e* to slide outward, while an inward rotation of the gear results in the first saw blade 301*e* retracting inward. Furthermore, when the clamping ring 203 is pressed, it exerts force on the first saw blade 301*e*, causing it to move outward. After the tank body 104 has been straightened, the first saw blade 301*e* resets under the influence of the first spring 303, subsequently causing the clamping ring 203 to reset and tightly abut against the tank body 104.

Moreover, each push member 302 includes a bottom column 302*a*, a second saw blade 302*b*, and an extension block 302*c*. The second saw blade 302*b* is positioned on the outer side of the first spring 303, while the bottom column 302*a* is located at the lower end of the second saw blade 302*b*. An extension block 302*c* is affixed to the side surface of the bottom column 302*a*. The second saw blade 302*b* is meshed with the third gear 301*a* and is firmly connected to the first spring 303. Furthermore, the bottom column 302*a* and the second saw blade 302*b* are securely attached, as are the extension block 302*c* and the bottom column 302*a*. When the first saw blade 301*e* moves outward due to external force, the third gear 301*a* causes the second saw blade 302*b* to shift inward. Simultaneously, the first spring 303 is compressed, applying pressure to the second saw blade 302*b*. This, in turn, pushes the extension block 302*c* at the bottom end of the bottom column 302*a* inward, thereby straightening the tank body 104. Upon the tank body 104 being straightened, the second saw blade 302*b* resets under the force of the first spring 303. Consequently, the first saw blade 301*e* is also reset, and the clamping ring 203 returns to securely abut against the tank body 104.

Additionally, each push member 302 includes a ratchet wheel 302*d*, a second spring 302*e*, a meshing block 302*f*, and a sliding case 302*g*. The ratchet wheel 302*d* is positioned on the outer side of the rotating column 102*d*, while the sliding case 302*g* is attached to the side surface of the extension block 302*c*. The second spring 302*e* and the meshing block 302*f* are both disposed within the sliding case 302*g*. The ratchet wheel 302*d* meshes with the meshing block 302*f*. The second spring 302*e* is firmly connected to the sliding case 302*g*, and its other end is affixed to the meshing block 302*f*. The meshing block 302*f* and the sliding case 302*g* are designed to slide against each other. When the extension block 302*c* moves inward, it propels the sliding case 302*g* inward as well. This action brings the meshing block 302*f* into contact with and meshed with the ratchet wheel 302*d*. The meshing block 302*f*, under pressure, resists any skewing of the sliding case 302*g* during meshed rotation. As the tank body 104 is straightened, the meshing block 302*f* and the ratchet wheel 302*d* begin to separate. Due to the ratchet wheel's characteristic, the second spring 302*e* propels the meshing block 302*f* upward during this movement. This ensures that the ratchet wheel 302*d* is not inadvertently rotated. Moreover, the height positions of the sliding cases 302*g* corresponding to the four clamping blocks 103*h* are staggered to prevent any mutual obstruction during the meshing process. Furthermore, three second springs 302*e* are arranged inside each sliding case 302*g* to ensure efficient operation of the meshing block 302*f* and to prevent any skewing.

During operation, if the tank body 104 tilts, the clamping ring 203 on the side where the tank body tilts exerts pressure on the articulation seat 202*a*, causing it to move outward. This movement of the articulation seat 202*a* then drives the first saw blade 301*e* to move outward. As the first saw blade 301*e* moves outward and the third gear 301*a* rotates, the second saw blade 302*b* moves inward, subsequently driving the extension block 302*c* to move inward as well. This inward movement of the extension block 302*c* propels the sliding case 302*g* to also move inward. The meshing block 302*f* meshes with and exerts pressure on the ratchet wheel 302*d*, preventing any skewing of the sliding case during meshed rotation. Once the tank body 104 is straightened, the meshing block 302*f* and the ratchet wheel 302*d* begin to separate. Thanks to the ratchet wheel's design, the second spring 302*e* propels the meshing block 302*f* upward as it moves, ensuring that the ratchet wheel 302*d* does not rotate during this process. The extension block 302*c* is reset, which in turn resets the third gear 301*a* in a counterclockwise direction. Simultaneously, the inner rod 201*a* moves into its reset position, causing the clamping ring 203 to tightly abut against the tank body 104.

It should be noted that the above embodiments are merely illustrative of the technical solutions of the present disclosure, and are not intended to be limiting. Although the present disclosure is described in detail with reference to the preferred embodiments, it should be understood that those of ordinary skill in the art can make modifications or equivalent replacements to the technical solutions of the present disclosure without departing from the spirit and scope of the technical solutions of the present disclosure. These modifications and equivalent replacements shall fall within the scope of claims of the present disclosure.

The invention claimed is:

1. A tank body device for measuring slurry density of thermal power generation slurry, comprising:

a clamping assembly (100), comprising a base case (101), a rotating assembly (102), closing assembly (103), and a tank body (104), wherein the rotating assembly (102) is positioned within the base case (101) in a penetrating manner, the closing assembly (103) are arranged at the upper end of the rotating assembly (102), the tank body (104) is arranged on the inner sides of the closing assembly (103), wherein the rotating assembly (102) and the base case (101) are rotatably connected, the closing assembly (103) and the rotating assembly (102) are rotatably connected, and the tank body (104) is fit with the closing assembly (103);

a clinging assembly (200), comprising telescopic members (201), articulation pieces (202), and clamping rings (203), wherein the articulation pieces (202) are positioned at the upper ends of the closing assembly (103), the telescopic members (201) are arranged at the upper ends of the articulation pieces (202), the clamping rings (203) are arranged at the upper ends of the telescopic members (201), wherein the articulation pieces (202) and the closing assembly (103) are fixedly connected, the telescopic members (201) and the articulation pieces (202) are rotatably connected, and the clamping rings (203) and the telescopic members (201) are fixedly connected; and a plurality of push assembly (300), comprises a moving part (301), a push member (302), and a first spring (303), wherein the moving part (301) is positioned at the bottom end of each articulation piece (202), the push member (302) is arranged at the bottom end of the moving part (301), the push member (302) penetrates through the base case (101), the first spring (303) is disposed on a side surface of the closing assembly (103) and the other end of the first spring (303) is attached to a side surface of the moving part (301), wherein the moving part (301) and each articulation piece (202) are fixedly connected, the push member (302) is firmly connected to the moving part (301), the first spring (303) and the moving part (301) are fixedly connected, and the first spring (303) is firmly connected to the closing assembly (103).

2. The tank body device for measuring slurry density of thermal power generation slurry according to claim 1, wherein the rotating assembly (102) comprises a first gear (102a), a second gear (102b), a rotating handle (102c), and a rotating column (102d);

wherein the first gear (102a) penetrates through a side surface of the base case (101), the second gear (102b) is positioned on a side surface of the first gear (102a), the rotating column (102d) is situated on the inner side of the second gear (102b), the rotating handle (102c) is arranged at the outer end of the first gear (102a), the second gear (102b) is meshed with the first gear (102a), the rotating handle (102c) and the first gear (102a) are fixedly connected, and the rotating column (102d) is firmly connected to the second gear (102b).

3. The tank body device for measuring slurry density of thermal power generation slurry according to claim 2, wherein the closing assembly (103) comprises a first junction block (103a), a second junction block (103b), first connecting columns (103c), a first moving block (103d), a second moving block (103e), a third moving block (103f), and a fourth moving block (103g);

wherein the first junction block (103a) is arranged on the outer side of the rotating column (102d), the second junction block (103b) is positioned on the outer side of the rotating column (102d), the first connecting columns (103c) are arranged at both ends of the first junction block (103a), the first connecting columns (103c) are arranged at both ends of the second junction block (103b), the first moving block (103d) is disposed on the left side of the first junction block (103a), the second moving block (103e) is disposed on a the side of the first junction block (103a), the third moving block (103f) is configured at the front end of the second junction block (103b), the fourth moving block (103g) is positioned at the rear end of the second junction block (103b), wherein the first junction block (103a) and the rotating column (102d) are rotatably connected, the second junction block (103b) and the rotating column (102d) are rotatably connected, the first connecting columns (103c) and the first junction block (103a) are fixedly connected, the first connecting columns (103c) and the second junction block (103b) are fixedly connected, the first moving block (103d) and the first connecting columns (103c) are rotatably connected, the second moving block (103e) and the first connecting columns (103c) are rotatably connected, the third moving block (103f) and the first connecting columns (103c) are rotatably connected, and the fourth moving block (103g) and the first connecting columns (103c) are rotatably connected.

4. The tank body device for measuring slurry density of thermal power generation slurry according to claim 3, wherein the closing assembly (103) further comprises clamping blocks (103h) and second connecting columns (103i);

wherein one of the second connecting columns (103i) is disposed on the outer end of the first moving block (103d), one of the second connecting columns (1031) is positioned on the outer end of the second moving block (103e), one of the second connecting columns (103i) is arranged at the outer end of the third moving block (103f), and another one of the second connecting columns (1031) is arranged at the outer end of the fourth moving block (103g), while the clamping blocks (103h) are respectively positioned at the upper ends of the second connecting columns (103i);

wherein the first moving block (103d) and the corresponding second connecting column (103i) are fixedly connected, the second moving block (103e) and the corresponding second connecting column (103i) are fixedly connected, the third moving block (103f) and the corresponding second connecting column (103i) are fixedly connected, the fourth moving block (103g) and the corresponding second connecting column (103i) are fixedly connected, and the clamping blocks (103h) and the second connecting columns (103i) are rotatably connected.

5. The tank body device for measuring slurry density of thermal power generation slurry according to claim 4, wherein each of the telescopic members (201) comprises an inner rod (201a) and an outer rod (201b);

wherein the inner rod (201a) is positioned on the outer side of the clamping ring (203), the outer rod (201b) is arranged on the outer side of the inner rod (201a), the inner rod (201a) and the clamping ring (203) are fixedly connected, and the outer rod (201b) and the inner rod (201a) are slidingly connected.

6. The tank body device for measuring slurry density of thermal power generation slurry according to claim 5, wherein each of the articulation pieces (202) comprises an articulation seat (202a) and a rotating block (202b);

wherein the rotating block (202b) is arranged at the bottom end of the outer rod (201b), the articulation seat (202a) is positioned on the outer side of the rotating block (202b), the rotating block (202b) and the outer rod (201b) are fixedly connected, and the articulation seat (202a) and the rotating block (202b) are rotatably connected.

7. The tank body device for measuring slurry density of thermal power generation slurry according to claim 5, wherein the moving part (301) comprises a third gear (301*a*), an intermediate block (301*b*), a cavity (301*c*), and a rotating column (301*d*);

> wherein the intermediate block (301*b*) is arranged on a side surface of the clamping block (103*h*), the cavity (301*c*) is formed within the intermediate block (301*b*), the rotating column (301*d*) penetrates through the cavity (301*c*), the third gear (301*a*) is arranged within the cavity (301*c*), the third gear (301*a*) is positioned on the outer side of the rotating column (301*d*), the intermediate block (301*b*) and the clamping block (103*h*) are fixedly connected, the rotating column (301*d*) and the intermediate block (301*b*) are fixedly connected, and the third gear (301*a*) and the rotating column (301*d*) are rotatably connected.

8. The tank body device for measuring slurry density of thermal power generation slurry according to claim 7, wherein the moving part (301) further comprises a first saw blade (301), and sliding blocks (301*g*); each clamping block (103*h*) comprises a sliding chute (301*f*);

> wherein the sliding chute (301*f*) is formed on the upper surface of each clamping block (103*h*), the sliding blocks (301*g*) are arranged at two ends of the first saw blade (301*e*), the first saw blades (301*e*) are meshed with the third gear (301*a*), the first saw blade (301*e*) and the sliding blocks (301*g*) are fixedly connected, the first saw blade (301*e*) and each articulation seat (202*a*) are fixedly connected, and the sliding blocks (301*g*) and the sliding chute (301*f*) are slidingly connected.

9. The tank body device for measuring slurry density of thermal power generation slurry according to claim 8, wherein the push member (302) comprises a bottom column (302*a*), a second saw blade (302*b*), and an extension block (302*c*);

> wherein the second saw blade (302*b*) is positioned on the outer side of the first spring (303), the bottom column (302*a*) is arranged at the bottom end of the second saw blade (302*b*), the extension block (302*c*) is arranged on a side surface of the bottom column (302*a*), the second saw blade (302*b*) is meshed with the third gear (301*a*), the second saw blade (302*b*) and the first spring (303) are fixedly connected, the bottom column (302*a*) and the second saw blade (302*b*) are fixedly connected, and the extension block (302*c*) and the bottom column (302*a*) are fixedly connected.

10. The tank body device for measuring slurry density of thermal power generation slurry according to claim 9, wherein the push member (302) further comprises a ratchet wheel (302*d*), a second spring (302*e*), a meshing block (302*f*), and a sliding case (302*g*);

> wherein the ratchet wheel (302*d*) is arranged on the outer side of the rotating column (102*d*), the sliding case (302*g*) is arranged on a side surface of the extension block (302*c*), the second spring (302*e*) is disposed within the sliding case (302*g*), the meshing block (302*f*) is positioned within the sliding case (302*g*), the ratchet wheel (302*d*) is meshed with the meshing block (302*f*), the second spring (302*e*) and the sliding case (302*g*) are fixedly connected and the other end of the second spring (302*e*) is firmly connected to the meshing block (302*f*), and the meshing block (302*f*) and the sliding case (302*g*) are slidingly connected.

\* \* \* \* \*